United States Patent
Renard et al.

(10) Patent No.: US 8,741,793 B2
(45) Date of Patent: Jun. 3, 2014

(54) VITREOUS MATERIAL WITH VISUAL EFFECTS AND ITS APPLICATIONS

(75) Inventors: Olivier Renard, Fontanil-Cornillon (FR); Céline Noel, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 226 days.

(21) Appl. No.: 13/000,541

(22) PCT Filed: Jun. 24, 2009

(86) PCT No.: PCT/FR2009/000764
§ 371 (c)(1),
(2), (4) Date: Mar. 23, 2011

(87) PCT Pub. No.: WO2010/007238
PCT Pub. Date: Jan. 21, 2010

(65) Prior Publication Data
US 2011/0189412 A1    Aug. 4, 2011

(30) Foreign Application Priority Data
Jun. 25, 2008   (FR) ...................................... 08 03564

(51) Int. Cl.
C03C 3/102    (2006.01)
C09K 11/08    (2006.01)
C09K 11/66    (2006.01)

(52) U.S. Cl.
USPC ...................................... 501/60; 252/301.4 F (58) Field of Classification Search
USPC ...................... 501/37, 60, 61, 62; 252/301.4 F
See application file for complete search history.

(56) References Cited

U.S. PATENT DOCUMENTS

| | | | |
|---|---|---|---|
| 3,629,137 A | 12/1971 | Masuda | |
| 3,935,119 A | 1/1976 | Barber et al. | |
| 5,366,937 A * | 11/1994 | Schneider et al. | ............... 501/40 |
| 6,197,710 B1 * | 3/2001 | Ohara et al. | ....................... 501/4 |
| 6,916,753 B2 * | 7/2005 | Cho et al. | ......................... 501/57 |
| 2003/0207746 A1 | 11/2003 | Cho et al. | |
| 2005/0179008 A1 * | 8/2005 | Xiao et al. | ............... 252/301.4 F |

FOREIGN PATENT DOCUMENTS

| | | |
|---|---|---|
| CN | 1603265 A | 4/2005 |
| JP | 53-85813 | 7/1978 |

OTHER PUBLICATIONS

Search Report and Written Opinion for International Application No. PCT/FR2009/000764, dated Dec. 9, 2009; 23 pages.

* cited by examiner

Primary Examiner — Noah Wiese
(74) Attorney, Agent, or Firm — Alston & Bird LLP (57) ABSTRACT

The present invention relates to a vitreous material possessing visual effects, particularly of fluorescence, when it is lit by ultraviolet light in the visible spectrum. These glasses are particularly applicable to the manufacture of decorative objects.

22 Claims, 5 Drawing Sheets

VITREOUS MATERIAL WITH VISUAL EFFECTS AND ITS APPLICATIONS

FIELD OF THE INVENTION

The present invention relates to a glass material having visual effects, in particular fluorescence effects, when it is illuminated by ultraviolet radiation, in the visible range. This glass may especially be applicable for the manufacture of decorative articles.

BACKGROUND OF THE INVENTION

Glasses are generally colored by incorporating three types of elements:
i) coloring ions (iron, manganese, chromium, etc.);
ii) nonmetallic centers (selenium, phosphorus, etc.) or certain compounds thereof; and
iii) metal atoms (gold, silver, copper).

These elements thus give the glasses into which they are incorporated certain properties of absorbing incident radiative energy. When incident radiation is absorbed, the material changes to an excited state. In general, it returns to its initial (i.e. unexcited) state by dissipating the surplus energy in the form of heat. In certain cases, it may also dissipate this energy in the form of light radiation of lower energy than that having resulted in the excited state: this is luminescence (comprising fluorescence, in which the lifetime of the excited state is very short; and phosphorescence, in which the lifetime of the excited state is relatively long). The lifetime of the excited state may be influenced by the composition of the glass. In the case of uranium, the lifetime is short in an alkaline glass (the glass is therefore fluorescent) and long in a glass having a high silica content (the glass may then instead be phosphorescent).

Several factors may influence the luminescence intensity of materials containing active centers. For example, in general the luminescence yield of a glass containing a luminescent center is lower than for a crystalline material containing this same active center. Other factors affecting the luminescence that may be mentioned include the temperature and attenuation or extinction (more commonly known as "quenching" effects, by concentration of the fluorescent center). In the case of glass, the chemical composition of the latter may also limit the luminescence: iron is the main impurity that may reduce or even completely quench the luminescence. Certain halogens have the same effect in the glass.

Among all the active centers that may make a glass fluorescent, rare-earth ions constitute a special class. Their specificity stems from the way in which their electrons occupy the various energy levels. This is because they possess a full outer shell protecting an inner shell from being filled. Their chemical properties are therefore similar and internal electronic transitions between the energy levels are possible and shielded by the outer shell. Thus, their fluorescence colors are in general largely insensitive to their chemical and structural environment. However, a person skilled in the art will be able to measure a few differences in the fineness of their fluorescence spectrum such as, for example, a variation in intensity of the various fluorescence lines or in the width of these lines depending on the nature of the crystalline field (R. Reisfeld et al., Journal of Luminescence, 2003, 102-103, 243-247). However, in general the position of these lines (i.e. the energy levels of these centers) will remain unchanged.

The fluorescence of silica glasses containing rare-earth ions has been studied. Thus, a number of authors have demonstrated a quenching effect by too high a concentration of fluorescence centers in silica glasses (K. Rosenhauer and F. Weidert, Glastech. Ber., 1938, 16, 51-57). Indeed, for neodymium oxide contents greater than 10% the glasses studied no longer fluoresce.

Moreover, it follows from the teaching of U.S. Pat. No. 2,097,275 that the presence of iron in a glass matrix, in an amount of 0.01% by weight or higher, could lead to the quenching of samarium fluorescence. It has also been demonstrated that, below this limit, there is an optimum intensity of samarium fluorescence as a function of the iron content.

However, U.S. Pat. No. 2,254,956 relates to a study in which a lead or bismuth synergy effect on the fluorescence intensity of cerium $Ce^{3+}$ has been demonstrated. Thus, in aluminosilicate glasses, the fluorescence of $Ce^{3+}$ between 334 and 480 nm, under excitation at a wavelength of 253.7 nm, is increased by 50% by introducing a few percent of lead oxide (3 wt % maximum), without the emission line width being affected thereby. Furthermore, the above patent indicates that if the material contains large amounts (30 wt %) of calcium fluoride, the intensity is further increased, as is the width of the emission band (303 nm to 480 nm).

Fluorescent glasses may be used in a variety of fields:
in the optics field, these materials are used as optical components (filters, optical fibers, etc.). U.S. Pat. No. 6,916,753 in particular describes a thulium-doped silica glass, the fluorescence of which lies at around 1400 nm: such a glass finds applications in the field of optical fibers. Likewise, U.S. Pat. No. 6,879,609 describes, in the case of optical fibers, a thulium-doped aluminosilicate glass, the excitation of which in the infrared (1060 nm) gives several fluorescence peaks in the visible according to an up-conversion photon emission process. Finally, U.S. Pat. No. 6,762,875 discloses a method for creating optical index variations for optical components using rare earths;

as glass diagnostic tools: pure glasses do not fluoresce as they do not absorb ultraviolet (UV) radiation. Thus, the characterization of matrices (appearance or disappearance of glassy zones depending on the heat treatment received) and the presence of certain impurities may be demonstrated by studying the fluorescence properties of the materials;

in the illumination field, their use however remains limited: it seems to be more effective to excite a film of crystalline phosphors deposited on a nonfluorescent glass rather than exciting a glass containing luminophore. However, certain compositions seem to give useful results. Thus, patent application EP 0 338 934-A1 discloses a composition based on Ce, Tb and Mn for obtaining white fluorescence under excitation by a low-pressure mercury lamp. The glass matrix used in this case is boron oxide ($B_2O_3$) or a boron oxide/silicon dioxide ($B_2O_3/SiO_2$) mixture in which the $SiO_2$ content is less than 20 mol %;

other types of fluorescent glass are also capable of finding various applications (illumination in mercury vapor lamps, display panels, decorative lighting, etc.). To give an example, U.S. Pat. No. 4,038,203 provides a number of different compositions for obtaining various colors in an alkaline phosphate glass activated by yttrium oxide. Thus, by doping this glass with europium oxide, pink fluorescence is obtained under excitation at a wavelength of 400, 460 or 530 nm. A green tint is produced by introducing terbium oxide. The color blue, obtained by doping with thallium, has however the major drawback of requiring the material to be excited at a wavelength of 250 nm, since no fluorescence can be obtained under excitation at 360 nm. Other colors, ranging from yellow to orange, may be obtained by codoping the material with terbium and europium in defined proportions; and in the food packaging field, as described for example in international application WO 2006/20663, the use of rare-earth ions possibly combined with metal ions such as titanium ions makes it possible to obtain soda-lime glasses having defined optical (UV filter) properties, for the purpose of preserving products better, while still remaining transparent, or for the purpose of obtaining color effects (fluorescence or dichroism).

Studying the prior art therefore shows that there are few examples of industrial application of fluorescent silica glasses for decorative use. Only a few anecdotal cases may be reported. Moreover, these are examples held by a few antique collectors, such as:

uranium glass or "vaseline glass": in this case, the fluorescence obtained under UV illumination is green. However, industrialization of this type of glass for decorative usage is difficult because of the legislation regarding uranium. Moreover, this type of glass is yellow in color when observed under normal illumination, which does not necessarily correspond to the desired effect; and manganese-doped glasses create an orange coloration under UV illumination. The fluorescence color seems to vary according to the composition of the glass and also seems to be of low intensity. Under ambient illumination, the glass is not colorless.

The examples described in the prior art show the possibility of obtaining various fluorescence colors under UV illumination in various glass matrices. However, the type of UV used to reveal such fluorescence varies from UVA (between 320 and 400 nm) to UVB (290 to 320 nm). However, UVB is very hazardous for the human eye and precludes envisaging an actual application in the decorative field.

Finally, the studies in the prior art show that the composition of the glass matrix is strongly dependent on the intensity of the fluorescence obtained. Thus, iron, which is a commonly encountered impurity, alters the fluorescence of the material right from very low contents (<0.01%).

Thus, it appears that there is no glass for decorative use that currently meets all the following optical characteristics:

being transparent (colorless or colored) under illumination using a "white" source (sunlight, incandescent light, neon tube, halogen bulb, etc.), while still possibly having dichroic properties (in which the color varies according to the white light source used to illuminate the article);

being fluorescent under UVA illumination, preferably at a wavelength between 360 and 400 nm, the emission intensity being sufficient to be perceived by the human eye; and being able to be produced within a wide fluorescence color palette, while still meeting, however, the two abovementioned characteristics: blue, yellow, green, orange, red and white.

SUMMARY OF THE INVENTION

It is therefore in order to provide a glass material meeting all these characteristics that the inventors have developed what forms the subject matter of the present invention.

One subject of the present invention is therefore an optically transparent glass material, characterized in that it comprises:

at least 50% silica by weight;
at least 10% lead by weight;

one or more luminescent active centers chosen from mixtures of the following rare-earth ions: ($Eu^{3+}/Tb^{3+}$), ($Tb^{3+}/Tm^{3+}$), ($Eu^{3+}/Tm^{3+}$) and ($Eu^{3+}/Tb^{3+}/Tm^{3+}$).

In the context of the present invention, the term "optically transparent material" is understood to mean a material that lets light through it in such a way that it has an absorbance (i.e. an optical density) of 3.5 $cm^{-1}$ or less (using the equation of the Beer-Lambert law) at a wavelength between 380 and 800 nm.

In what follows, and unless mentioned otherwise, all the indicated percentages are percentages by weight expressed relative to the total weight of the material according to the invention.

Within the material according to the invention, silica preferably represents about 50 to 85% by weight, a 53% content by weight being particularly preferred.

The presence of lead, in an amount of at least 10 wt %, makes it possible not only to obtain a material having the conventional properties (especially transparency) of crystal but also to create a region of significant absorption in the less-energetic UV range, thereby allowing sources which are not harmful to the eyes to be used to excite the material. This is because, in pure form, a silica glass (quartz) does not absorb UV, whereas a glass of standard composition absorbs below 290 nm and, in the case of a lead glass, the absorption front lies in the UVA region, i.e. at a wavelength between 320 and 400 nm. By introducing lead into the silica matrix it is therefore possible to modify the excitation spectrum.

According to the invention, lead is preferably present in an amount of between 20 and 40% by weight inclusive, and even more preferably between 25 and 35% by weight inclusive. A value of 30.5% by weight is most particularly preferred.

According to a preferred embodiment of the invention, the lead is present in the material in the form of lead oxide (PbO). The presence of lead oxide in the glass matrix promotes fluorescence emission. This is because, in other, lead-free, matrices, the intensities of the rare-earth fluorescence peaks are reduced: the color obtained is less pure (the intensity ratios between fluorescence peaks are shifted and modified) and less sharp (variation in the intensity of the fluorescence peaks).

Owing to the "network modifier" character of lead oxide, the inventors have discovered that the silica matrix is then particularly suitable for promoting the incorporation of fluorescent ions in large amounts, thereby making it possible to obtain very intense fluorescence of the material. The presence of lead oxide helps to increase the amount of active center that it is possible to incorporate into the silica matrix. In the particular case of europium or terbium, this amount is at least 15%. Such a matrix therefore can accept fluorescent center loadings that are compatible with a decorative application. For comparison, incorporating such high amounts of active centers in lead-free silica matrices results in opaque materials, indicating that the rare-earth oxides have not completely dissolved therein.

Another advantage is due to the transparent appearance of the materials obtained. Thus, under white ambient illumination, the materials according to the present invention are transparent and colorless, similar to a crystal undoped with fluorescent ions. Under UVA excitation (in general at a wavelength of about 360, 380 or 390 nm), the lead-rich glass matrices doped with rare-earth ions emit intense fluorescence, while still maintaining transparency of the material. The color of the matrix depends on the mixture of rare-earth ions chosen.

The mixtures of rare-earth ions present in the glass materials of the invention are chosen from the following mixtures: ($Eu^{3+}/Tb^{3+}$), ($Tb^{3+}/Tm^{3+}$), ($Eu^{3+}/Tm^{3+}$) and ($Eu^{3+}/Tb^{3+}/Tm^{3+}$).

The mixture of $Eu^{3+}$ ions and $Tb^{3+}$ ions in controlled amounts makes it possible to obtain a tint varying from yellow to orange under UVA illumination while the addition, to this mixture, of $Tm^{3+}$ makes it possible to obtain white. The mixing of $Tb^{3+}$ ions and $Tm^{3+}$ ions in controlled amounts gives various shades of green, while mixing $Eu^{3+}$ ions and $Tm^{3+}$ ions in controlled amounts gives various shades of pink.

According to one particularly preferred embodiment of the invention, when it is used, the ($Eu^{3+}/Tb^{3+}$) mixture represents 10% by weight and is composed of four to six parts by weight of $Eu^{3+}$ for six to four parts by weight of $Tb^{3+}$.

According to another particularly preferred embodiment of the invention, when it is used, the ($Tb^{3+}/Tm^{3+}$) mixture represents 5% by weight and is composed of two parts by weight of $Tb^{3+}$ for three parts by weight of $Tm^{3+}$.

According to another particularly preferred embodiment of the invention, when it is used, the ($Eu^{3+}/Tm^{3+}$) mixture represents 5% by weight and is composed of two parts by weight of $Eu^{3+}$ for three parts by weight of $Tm^{3+}$.

According to yet another particularly preferred embodiment of the invention, when it is used, the ($Eu^{3+}/Tb^{3+}/Tm^{3+}$) mixture represents 5% by weight and is composed of 0.8 parts of $Eu^{3+}$ ions, 1.2 parts of $Tb^{3+}$ ions and three parts of $Tm^{3+}$ ions.

The orange and yellow colors may be obtained by a single doping. For example, it is possible to obtain orange by doping with samarium, and yellow by doping with dysprosium. However, the colors obtained with a single doping are of lower intensity than with the $Eu^{3+}/Tb^{3+}$ special mixture.

Depending on the nature of the active center or centers present within the silica matrix, certain materials may also exhibit a dichroic effect.

According to one preferred embodiment of the invention, the rare-earth ions are preferably used in the form of oxides. This is because when they are not in the form of oxides, rare-earth ions generally contain negatively charged counterions (for example, phosphate or fluoride ions), the presence of which in the glass could result in fluorescence-quenching phenomena.

Within the material according to the invention, the active center or centers preferably represent 0.1 to 40%, and even more preferably 1 to 18%, by weight.

In addition to the constituents described above, the glass material according to the present invention may include one or more additives commonly used for manufacturing glasses, among which may especially be mentioned modifying oxides, such as fluxes and stabilizers.

Of course, a person skilled in the art would ensure on this occasion that the additive or additives optionally used are compatible with the intrinsic properties associated with the glass material in accordance with the present invention, in particular compatible with its luminescence properties.

Among fluxes, sodium oxide, potassium oxide, magnesium oxide and mixtures thereof may be more particularly mentioned.

When they are used, the flux or fluxes preferably represent 1 to 30% by weight.

Amongst stabilizers, and in addition to lead oxide which may be classified in this category of additives, mention may more particularly be made of alkaline-earth metal oxides such as calcium oxide, zinc oxide, iron oxide and mixtures thereof.

When they are used, the stabilizer or stabilizers preferably represent 1 to 30% by weight.

The glass materials according to the present invention may be used to manufacture luminescent decorative and/or utilitarian articles.

Thus, another subject of the present invention is the use of an optically transparent glass material as defined above for the manufacture of decorative and/or utilitarian articles made of luminescent crystal, in particular fluorescent crystal, and also the decorative and/or utilitarian articles obtained from a glass material according to the invention.

The material according to the present invention may thus for example be used for the manufacture of chandeliers, lamps (lamp stands and lamp shades), jewelry, vases, containers (cups, glasses, salad bowls, carafes), decorative glass panels, such as stained-glass windows, etc.

The decorative and/or utilitarian articles according to the present invention may be produced by the processes conventionally used in glassmaking, by incorporating the luminescent active center or centers during the manufacturing process.

According to a preferred embodiment of the invention, the decorative and/or utilitarian articles are manufactured using a high-temperature glass process comprising at least the following steps:
  i) a step of melting the various constituents of the glass material as defined in the invention, in order to obtain a molten glass composition;
  ii) a step of introducing, into the molten glass composition, the active center or centers in powder form, in order to obtain a doped glass composition;
  iii) a step of maintaining the doped glass composition at high temperature, generally above 1000° C., for a prolonged period, in general about 24 hours or longer;
  iv) a step of forming the glass composition at the working temperature of the glass in order to obtain the expected article, which forming step may optionally comprise several operations requiring a rise in temperature.
  v) a step of cooling the expected article in the ambient air; and
  vi) a stress-relieving heat treatment at a temperature significantly below the softening point of the glass composition, so as to release the thermal stresses that have built up in the article during cooling.

According to an alternative embodiment of this process, and compatible with the present invention, the decorative and/or utilitarian articles of the invention may also be manufactured according to the following steps:
  i) a step of producing a glass powder (of relatively fine particle size) having the required glass composition according to the invention (silica and lead at least);
  ii) a step of blending this glass powder with the active center or centers at room temperature, in order to obtain a doped glass composition; and then
  iii) the continuation of steps ii) to vi) of the previous process.

Processes for producing glasses by sol-gel techniques (i.e. mild processing) may be an alternative to the high-temperature melting process.

The sol-gel process that can be used to manufacture decorative and/or utilitarian articles according to the invention comprises the following steps:
  i) the catalyzed hydrolysis of a glass composition comprising the constituents of the glass material as defined above (in general, acid catalysis is recommended) or not depending on the type of active center constituting the chosen glass material;
  ii) the condensation and gelling of the glass composition;

iii) the deposition or molding of the gel in order to obtain the expected article; and iv) the low-temperature (in general 100-200° C.) heat treatment in order to dry and stabilize the structure, it being understood that the active center or centers may be introduced during the hydrolysis step or during the condensation step or just before the forming of the gel.

If necessary, the heat treatment may also be carried out at higher temperature (500-1000° C.) in order to densify the structure.

The sol-gel process is more particularly suitable for depositing coatings rather than producing bulk materials. Thus, using this process to deposit coatings on a finished article may be envisaged:

1) production and formation of the transparent glass material according to the high-temperature glass process; and
2) deposition of a homogeneous sol-gel coating on the entire part (or if necessary locally), so as to give the glass the luminescence property.

BRIEF DESCRIPTION OF THE DRAWINGS

Apart from the above arrangements, the invention also includes other arrangements arising from the following description, which refers to examples demonstrating the effect of the presence of lead in a silica matrix, whether or not doped with rare-earth ions, to examples of the preparation of glass materials according to the invention and to the appended FIGS. 1 to 10 in which:

FIGS. 4 to 9 show the fluorescence spectra of glass matrices containing 30% lead by weight (i.e. 12.5 mol %) doped with various rare-earth ions or mixtures of rare-earth ions obtained according to some of the processes described in examples 2 to 12. These spectra were obtained under excitation by UV neon light centered at 365 nm, the intensity of the fluorescence (in arbitrary units) being plotted as a function of the wavelength (in nm). In these figures:

DETAILED DESCRIPTION OF THE INVENTION

However, it should be understood that these examples are given merely as purely illustrative examples of the invention, in no way constituting any limitation of the invention.

EXAMPLE 1

Demonstration of the Effect of Incorporating Lead on the Luminescence of Glass Materials This example demonstrates that the presence of lead in a silica-based glass matrix, whether or not containing rare-earth ions as dopant, makes it possible to create a significant absorption zone in the less-energetic UV range, thereby enabling a material to be excited by sources that are not harmful to the eyes.

For this purpose, the absorption spectra of a pure silica (quartz) plate, a standard glass, in which the major constituents had the following molar composition: 6M of $SiO_2$, 1M of $Na_2O$, 1M of CaO, and a lead (crystal) glass in which the major constituents had the following molar composition: 6M of $SiO_2$, 1M of $K_2O$ and 1M of PbO, were recorded after excitation at a wavelength varying between 190 and 490 nm.

Figure 1:
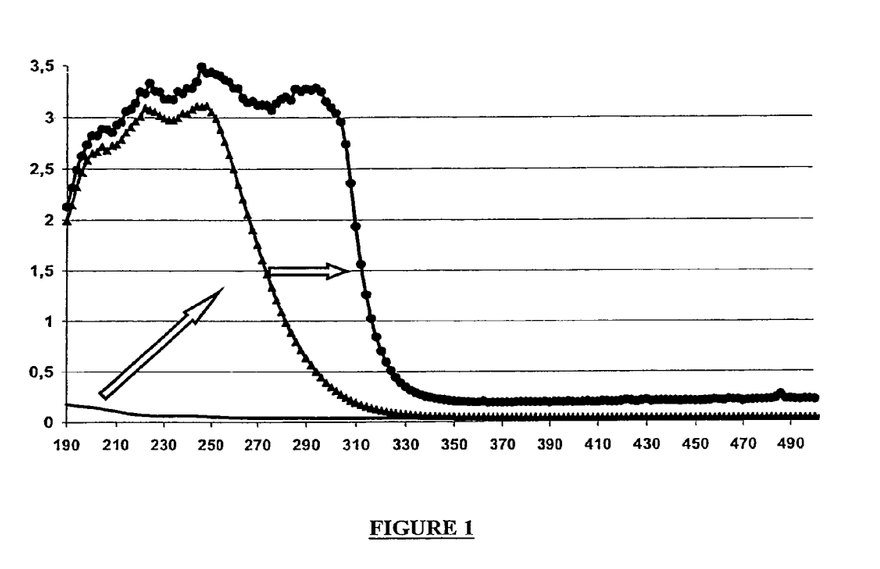
FIG. 1 shows the absorbance spectra (in arbitrary units) as a function of the wavelength (in nm) of a pure silica (quartz) plate (plain curve), a glass of standard composition (solid triangles) and a lead glass (solid circles) after excitation at a wavelength varying between 190 and 490 nm.

The spectra thus obtained are shown in the appended FIG. 1, in which the absorption expressed in arbitrary units is plotted as a function of the wavelength in nm. In this figure, the plain curve corresponds to the spectrum of the quartz plate, the curve with the solid triangles corresponds to the standard glass plate and the curve with the solid circles corresponds to that of the lead glass.

The spectra in FIG. 1 show that the quartz plate absorbs no radiation of wavelength above 210 nm, whereas the glass of standard composition absorbs below 290 nm and, in the case of the lead glass, the absorption front lies in the UVA region.

Also recorded were the excitation spectra (intensity of the emission measured at a wavelength of 610 nm) of a glass plate of standard molar composition (major constituents: 6M $SiO_2$, 1M $Na_2O$, 1M CaO) doped with 13 wt % (i.e. 6.1 mol %) europium $Eu^{3+}$ and of a lead glass plate (major constituents: 6M $SiO_2$, 1M $K_2O$ and 1M PbO) doped with 10 wt % (i.e. also 6.1 mol %) europium $Eu^{3+}$.

Figure 2:
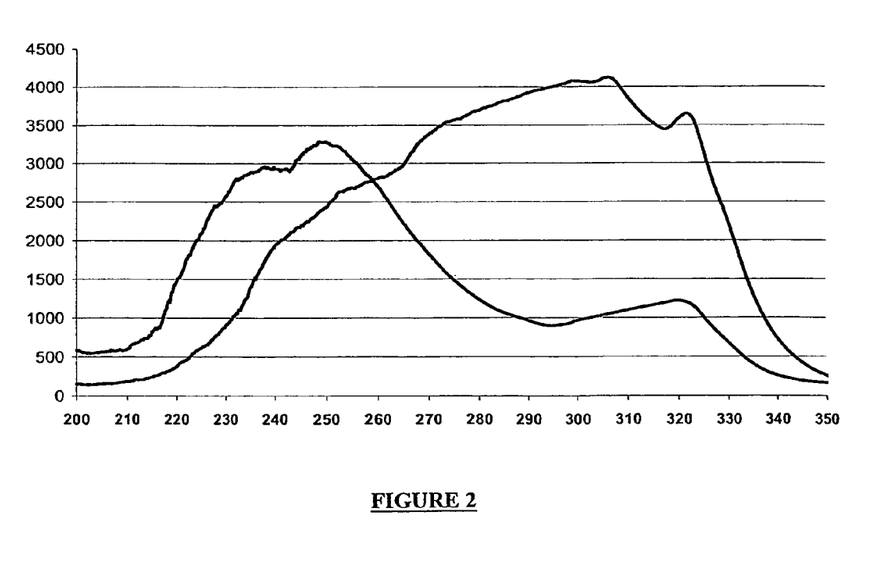
FIG. 2 shows the excitation spectra (intensity of the emission measured at a wavelength of 610 nm) of a glass plate, made of a glass of standard composition doped with 13 wt % (i.e. 6.1 mol %) europium $Eu^{3+}$ (lowermost curve) and a plate of lead glass also doped with 10 wt % (i.e. 6.1 mol %) europium $Eu^{3+}$ (uppermost curve), in which figure the intensity of the emission (in arbitrary units) is plotted as a function of the wavelength (in nm)

The excitation spectra thus obtained are shown in the appended FIG. 2, in which the emission intensity, expressed in arbitrary units, is plotted as a function of the wavelength expressed in nm. In this figure, the lowermost curve corresponds to the excitation spectrum of the standard glass plate and the uppermost curve corresponds to that of the lead glass.

These results show that the presence of lead oxide makes it possible to create glass matrix excitation regions above 300 nm.

Figure 3:
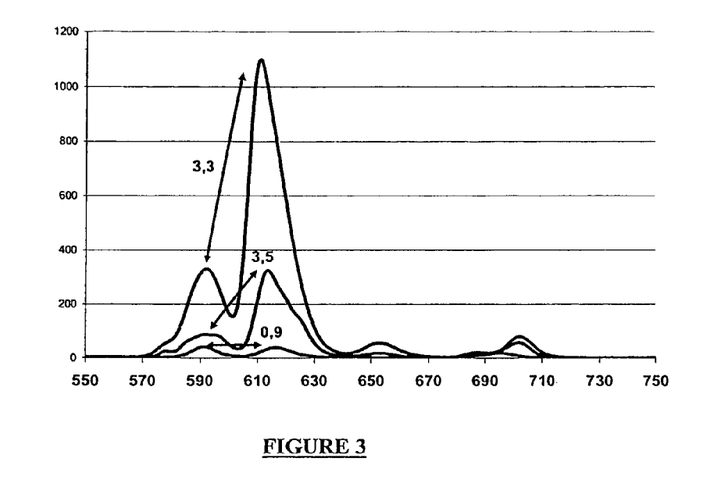
FIG. 3 shows the excitation spectra at 395 nm of various $SiO_2$-based glass matrices doped with europium $Eu^{3+}$ (at 6.1 mol %): lead glass (uppermost curve), soda-lime glass (intermediate curve) and a glass obtained according to a sol-gel process (lowermost curve), in which figure the emission intensity (in arbitrary units) is plotted as a function of the wavelength (in nm)

The appended FIG. 3 shows the excitation spectra at 395 nm of various $SiO_2$-based glass matrices:
- lead glass of the following molar composition: 6 $SiO_2$, 1 $K_2O$, 1 PbO (major constituents);
- soda-lime glass of the following composition: 6 $SiO_2$, 1 $Na_2O$, 1 CaO (major constituents); and
- glass obtained using a sol-gel process, of the following composition: $SiO_2$ (major constituent).

Each of these matrices contained 10% europium $Eu^{3+}$ by weight.

In this figure, the emission intensity, corrected for the molar concentration of $Eu^{3+}$ europium ions, is plotted as a function of the wavelength in nm. The uppermost curve corresponds to the lead glass, the intermediate curve to the soda-lime glass and the lowermost curve corresponds to the glass obtained using the sol-gel process.

As may be seen in the appended FIG. 3, the presence of lead oxide in the glass matrix promotes the emission of fluorescence. This is because in the other matrices, containing no lead, the intensities of the $Eu^{3+}$ europium ion fluorescence peaks are lower and the color obtained is less pure (the intensity ratios between fluorescence peaks are shifted and modified) and less sharp (variation in the intensity of the fluorescence peaks).

EXAMPLES 2 TO 11

Preparation of Colored Glasses

The embodiments given below describe the incorporation of rare-earth ions into lead-rich silica (crystal) glass matrices having the following molar composition:
- $SiO_2$ about 75%
- PbO about 12.5%
- $K_2O$ about 12.5%

In these matrices, the 12.5 mol % amount given for lead oxide corresponds to a 30% amount of lead by weight.

The rare-earth oxides were in the form of coarse powders, which were therefore gently ground using a mortar and then blended with the crystal powder in the proportions indicated in Table I below:

Each of the blends, in powder form, were then put into a platinum crucible closed off by a cover and then placed in a furnace so as to undergo a heat treatment at 1350° C. for a period of 24 hours, according to the cycle indicated below:
a) 0 to 6.6 hours: linear rise in temperature from room temperature to 1350° C.;
b) from 6.6 to 30.6 hours: a hold at a constant temperature of 1350° C.;
c) from 30.6 to 37.6 hours: linear decrease in temperature from 1350° C. to 500° C.;
d) from 37.6 to 40.9 hours: linear decrease in temperature from 500° C. to 400° C.; and
e) from 40.9 to 44 hours: linear decrease in temperature from 400° C. to room temperature.

Once room temperature had been reached, the specimen was removed from the mold.

The colors of the colored glasses thus obtained are given in Table II below according to the light source used to illuminate them:

TABLE II

| | Color | |
| --- | --- | --- |
| Example | Under white light | Under UV ($\lambda_{excitation}$ centered at 365 nm) |
| 2 | Colorless | Red |
| 3 | Colorless | Orange |
| 4 | Colorless | Orange |
| 5 | Colorless | Yellow |
| 6 | Colorless | Yellow |
| 7 | Colorless | Green |
| 8 | Colorless | Sea green |
| 9 | Colorless | Blue |
| 10 | Colorless | Pink |
| 11 | Colorless | White |

The fluorescence spectra of the glasses obtained in examples 2 to 11, under excitation by UV neon light centered at 365 nm, are also shown in the appended FIGS. 4 to 8 in which the intensity of the fluorescence (expressed in arbitrary units) is plotted as a function of the wavelength (in nm).

Figure 4:
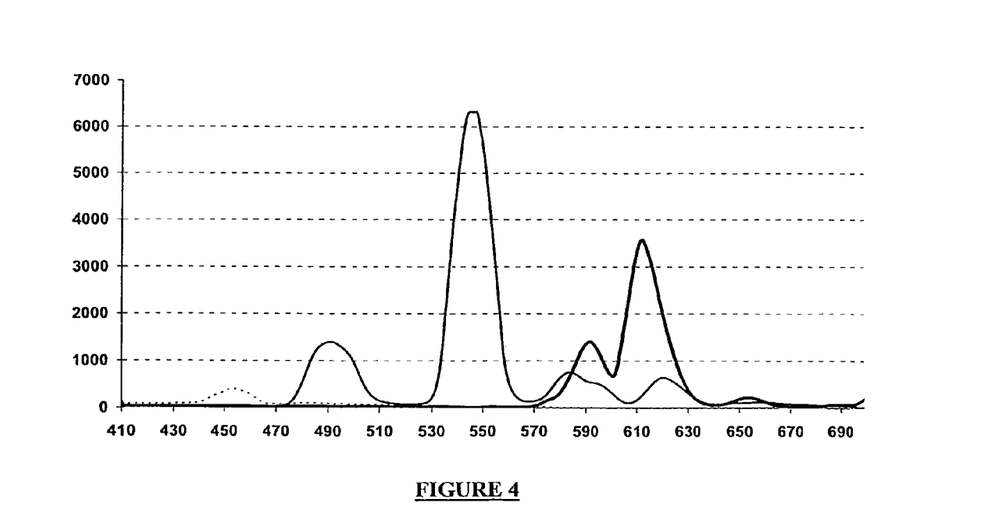
FIG. 4 shows the fluorescence spectra of materials obtained according to example 2 (intermediate curve), example 7 (uppermost curve) and example 9 (lowermost dotted curve)

FIG. 4 shows the fluorescence spectra of the materials obtained according to example 2 (intermediate curve), example 7 (uppermost curve) and example 9 (lowermost, dotted curve).

TABLE I

| | | Total doping content | | Mass (g) of: | | |
| --- | --- | --- | --- | --- | --- | --- |
| Example | Nature of the dopant(s) | wt % | mol % | Crystal | Dopant(s) | Dopant fraction(s) |
| 2 | $Eu_2O_3$ | 10 | 6.11 | 8.8421 | 1.1579 | 1 |
| 3 | $Sm_2O_3$ | 1 | 0.57 | 9.8840 | 0.1160 | 0.1 |
| 4 | $Eu_2O_3/Tb_4O_7$ | 10 | 6.05 | 8.8349 | 0.6948/0.4705 | 0.6/0.4 |
| 5 | $Dy_2O_3$ | 2 | 1.06 | 9.7704 | 0.2296 | 0.2 |
| 6 | $Eu_2O_3/Tb_4O_7$ | 10 | 6.02 | 8.8311 | 0.4632/0.7057 | 0.4/0.6 |
| 7 | $Tb_4O_7$ | 10 | 5.95 | 8.8238 | 1.1762 | 1 |
| 8 | $Tb_4O_7/Tm_2O_3$ | 5 | 1.13 | 9.4221 | 0.2352/0.3426 | 0.2/0.3 |
| 9 | $Tm_2O_3$ | 2 | 1.02 | 9.7716 | 0.2284 | 0.2 |
| 10 | $Tm_2O_3/Eu_2O_3$ | 5 | 1.18 | 9.7258 | 0.3426/0.2316 | 0.3/0.2 |
| 11 | $Eu_2O_3/Tb_4O_7/Tm_2O_3$ | 5 | 1.15 | 9.4236 | 0.0926/0.1411/0.3426 | 0.08/0.12/0.3 |

Figure 5:
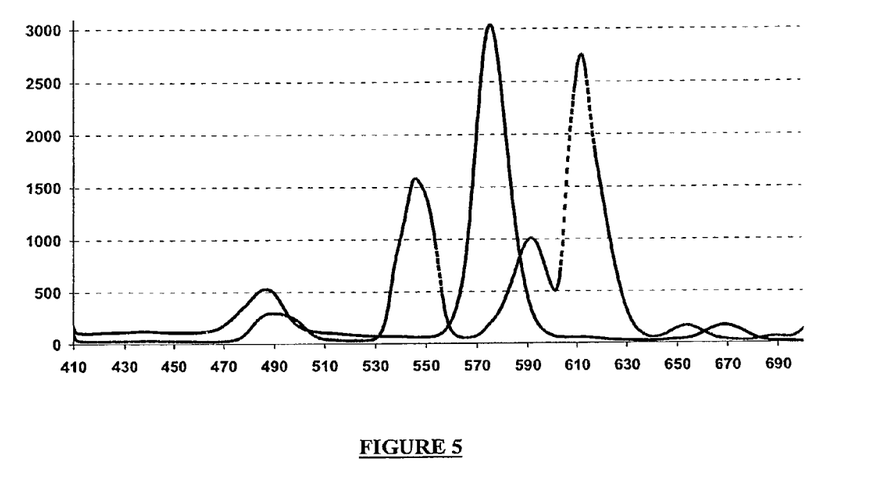
FIG. 5 shows the fluorescence spectra of materials obtained according to example 5 (uppermost curve) and example 6 (lowermost, dotted curve)

FIG. 5 shows the fluorescence spectra of the materials obtained according to example 5 (uppermost curve) and example 6 (lowermost, dotted curve).

Figure 6:
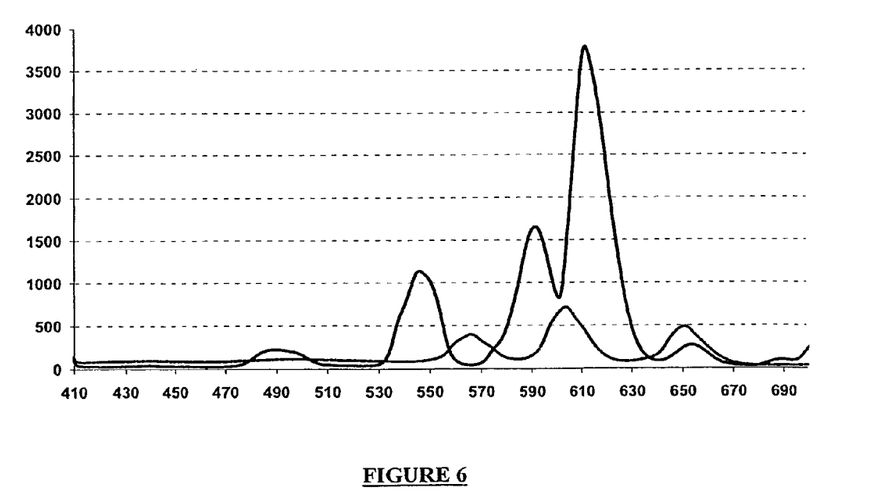
FIG. 6 shows the fluorescence spectra of materials obtained according to example 3 (lowermost curve) and example 4 (uppermost curve)

FIG. 6 shows the fluorescence spectra of the materials obtained according to example 3 (lowermost curve) and example 4 (uppermost curve).

Figure 7:
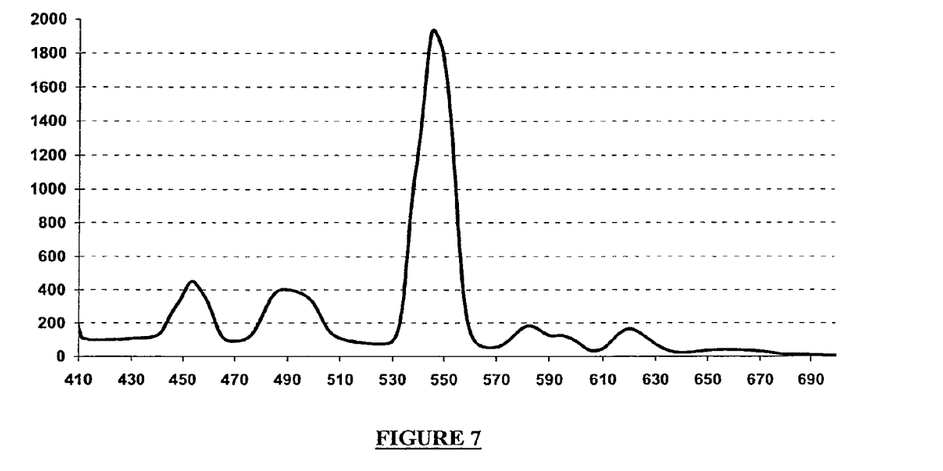
FIG. 7 shows the fluorescence spectrum of the material obtained according to example 8.

FIG. 7 shows the fluorescence spectra of the material obtained according to example 8.

Figure 8:
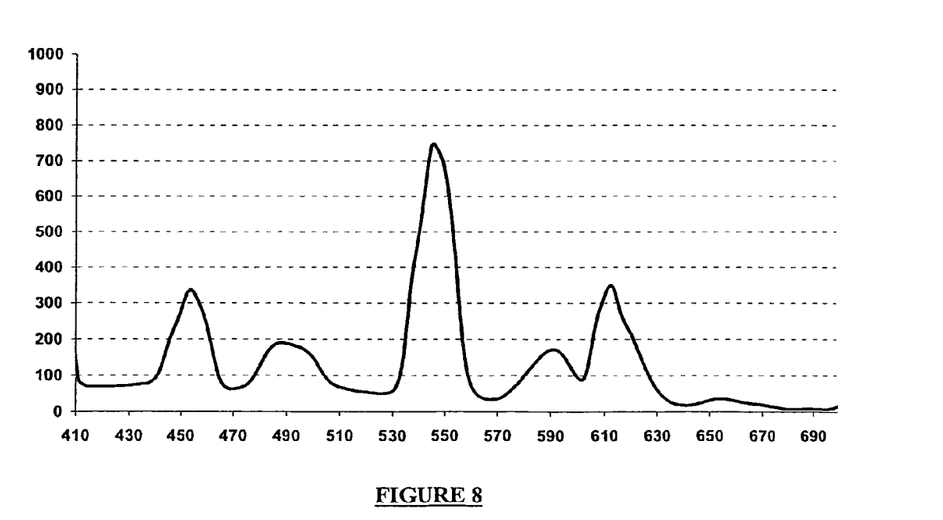
FIG. 8 shows the fluorescence spectrum of the material obtained according to example 11.

FIG. 8 shows the fluorescence spectra of the material obtained according to example 11.

Figure 9:
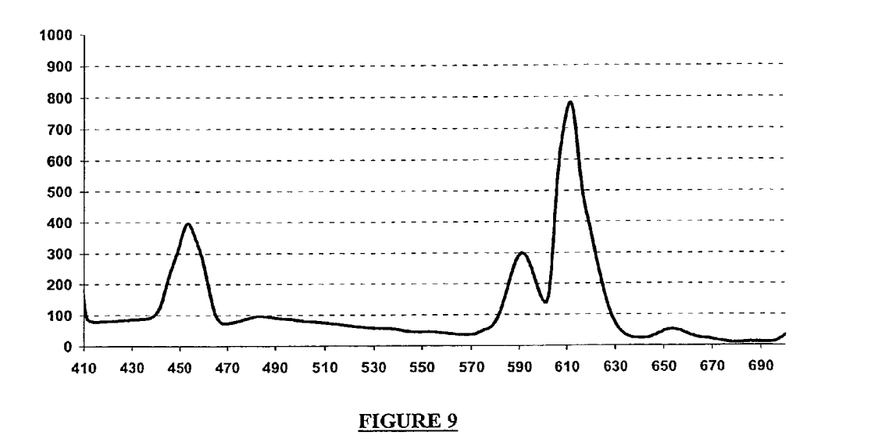
FIG. 9 shows the fluorescence spectrum of the material obtained according to example 10.

FIG. 9 shows the fluorescence spectra of the material obtained according to example 10.

EXAMPLE 12

Preparation of a Colored Glass Made with Holmium Oxide

In this example, a glass having dichroism properties was prepared from the same glass matrix as that used above for examples 2 to 11 and using the same preparation protocol. Holmium oxide powder was incorporated in the proportions indicated in Table III below:

TABLE III

| Nature of the dopant | Total doping content | | Mass (g) of: | | Dopant fraction(s) |
|---|---|---|---|---|---|
| | wt % | mol % | Crystal | Dopant(s) | |
| $Ho_2O_3$ | 10 | 5.64 | 8.8545 | 1.1455 | 1 |

The glass thus obtained had a transparent yellow color under illumination with natural light and a transparent pink color under neon illumination.

Figure 10:
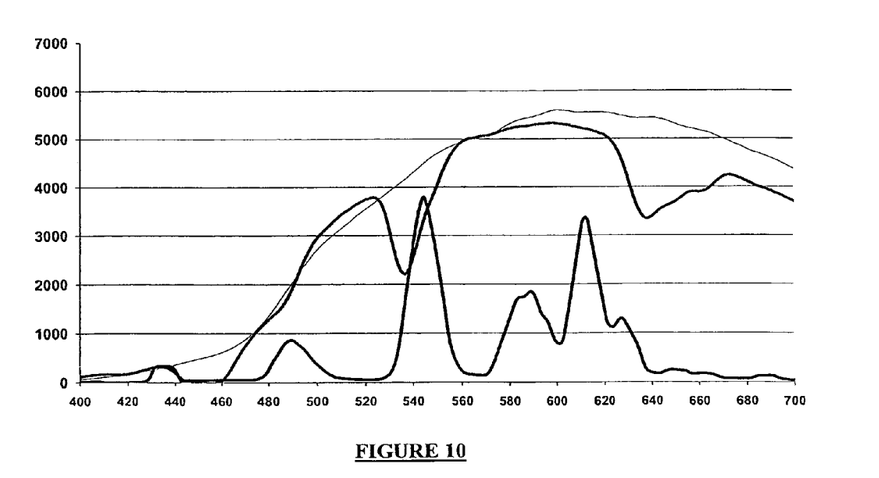
FIG. 10 shows the transmission spectrum under natural light and under white neon illumination of a glass matrix containing 30% lead by weight doped with holmium oxide (10% by weight). In this figure, the transmitted intensity (expressed in arbitrary units) is plotted as a function of the wave length (in nm). The uppermost (finest-lined) curve represents the transmission spectrum of natural light, the intermediate curve represents the spectrum transmitted by the specimen under natural light and the bottom curve represents the spectrum of white neon light.

The transmission spectrum of the glass thus obtained, under natural light and under white neon illumination, is shown in the appended FIG. 10 in which the transmitted intensity (expressed in arbitrary units) is plotted as a function of the wavelength (in nm). In this figure, the uppermost (and the finest-lined) curve represents the transmission spectrum of white light, the intermediate curve represents the spectrum transmitted by the specimen under natural light and the bottom curve represents the transmission spectrum of white neon light.

The invention claimed is:

1. A method for manufacturing decorative and/or utilitarian articles made of luminescent crystal comprising at least the step of incorporating an optically transparent glass material comprising:
    at least 50% silica by weight;
    at least 10% lead by weight; and
    one or more luminescent active centers chosen from mixtures of the following rare-earth ions: ($Eu^{3+}/Tb^{3+}$), ($Tb^{3+}/Tm^{3+}$), ($Eu^{3+}/Tm^{3+}$) and ($Eu^{3+}/Tb^{3+}/Tm^{3+}$), said rare-earth ions mixtures being introduced respectively in the form of ($Eu_2O_3/Tb_4O_7$), ($Tb_4O_7/Tm_2O_3$), ($Eu_2O_3/Tm_2O_3$) and ($Eu_2O_3/Tb_4O_7/Tm_2O_3$), during the manufacturing process.

2. A method as defined in claim 1 for manufacturing decorative and/or utilitarian articles made of fluorescent crystal.

3. A method as defined in claim 1 for manufacturing chandeliers, lamps, jewelry, vases, containers and panels made of decorative glass, such as stained-glass windows.

4. Luminescent decorative and/or utilitarian articles chosen from chandeliers, lamps, jewelry, vases, containers and panels made of decorative glass, characterized in that they are obtained from a glass material as defined in claim 1.

5. A process for manufacturing decorative and/or utilitarian articles made of luminescent crystal, as defined in claim 4, characterized in that said process comprises at least the following steps:
    i) a step of melting the various constituents of glass material, comprising at least 50% silica by weight; and at least 10% lead by weight, in order to obtain a molten glass composition;
    ii) a step of introducing, into the molten glass composition, one or more luminescent active centers chosen from mixtures of the following rare-earth ions: ($Eu^{3+}/Tb^{3+}$), ($Tb^{3+}/Tm^{3+}$), ($Eu^{3+}/Tm^{3+}$) and ($Eu^{3+}/Tb^{3+}/Tm^{3+}$), said rare-earth ions mixtures being introduced respectively in powder form of ($Eu_2O_3/Tb_4O_7$), ($Tb_4O_7/Tm_2O_3$), ($Eu_2O_3/Tm_2O_3$) and ($Eu_2O_3/Tb_4O_7/Tm_2O_3$), in order to obtain a doped glass composition;
    iii) a step of maintaining the doped glass composition at high temperature, above 1000° C., for a prolonged period, about 24 hours or longer;
    iv) a step of forming the glass composition at the working temperature of the glass in order to obtain the expected article;
    v) a step of cooling the expected article in the ambient air; and
    vi) a stress-relieving heat treatment at a temperature below the softening point of the glass composition, so as to relieve the thermal stresses that have built up in the article during cooling.

6. A process for manufacturing decorative and/or utilitarian articles as defined in claim 4, characterized in that said process comprises at least the following steps:
    i) a step of producing a glass powder having the glass composition material, comprising at least 50% silica by weight; and at least 10% lead by weight;
    ii) a step of blending this glass powder with one or more luminescent active centers chosen from mixtures of the following rare-earth ions: ($Eu^{3+}/Tb^{3+}$), ($Tb^{3+}/Tm^{3+}$), ($Eu^{3+}/Tm^{3+}$) and ($Eu^{3+}/Tb^{3+}/Tm^{3+}$), said rare-earth ions mixtures being introduced respectively in the form of ($Eu_2O_3/Tb_4O_7$), ($Tb_4O_7/Tm_2O_3$), ($Eu_2O_3/Tm_2O_3$) and ($Eu_2O_3/Tb_4O_7/Tm_2O_3$), at room temperature, in order to obtain a doped glass composition;
    iii) a step of maintaining the doped glass composition at high temperature, above 1000° C., for a prolonged period, about 24 hours or longer;
    iv) a step of forming the glass composition at the working temperature of the glass in order to obtain the expected article;
    v) a step of cooling the article obtained in the ambient air; and
    vi) a stress-relieving heat treatment at a temperature below the softening point of the glass composition, so as to relieve the thermal stresses that have built up in the article during cooling.

7. A process for manufacturing decorative and/or utilitarian articles characterized in that said process comprises at least the following steps:
    i) catalyzed hydrolysis of a glass composition comprising the constituents of the glass material, comprising at least 50% silica by weight; at least 10% lead by weight; and one or more andene or more luminescent active centers chosen from mixtures of the following rare-earth ions: ($Eu^{3+}/Tb^{3+}$), ($Tb^{3+}/Tm^{3+}$), ($Eu^{3+}/Tm^{3+}$) and ($Eu^{3+}/Tb^{3+}/Tm^{3+}$)
    ii) the condensation and gelling of the glass composition;

iii) the deposition or molding of the gel in order to obtain the expected article; and iv) the low-temperature heat treatment in order to dry and stabilize the structure, it being understood that the active center or centers are introduced during the hydrolysis step or during the condensation step or just before the forming of the gel.

8. A method as defined in claim 1, wherein the silica of the optically transparent glass material represents 50 to 85% by weight.

9. A method as defined in claim 1, wherein the lead of the optically transparent glass material is present in an amount of between 20 and 40% by weight inclusive.

10. A method as defined in claim 9, wherein the amount of lead is between 25 and 35% by weight inclusive.

11. A method as defined in claim 1, wherein the lead is present in the material in the form of lead oxide.

12. A method as defined in claim 1, wherein the optically transparent glass material comprises a mixture of rare-earth ions ($Eu^{3+}/Tb^{3+}$) representing 10% by weight and composed to four to six parts by weight of $Eu^{3+}$ for six to four parts by weight of $Tb^{3+}$.

13. A method as defined in claim 1, wherein the optically transparent glass material comprises a mixture of rare-earth ions ($Tb^{3+}/Tm^{3+}$) representing 5% by weight and composed of two parts by weight of $Tb^{3+}$ for three parts by weight of $Tm^{3+}$.

14. A method as defined in claim 1, wherein the optically transparent glass material comprises a mixture of rare-earth ions ($Eu^{3+}/Tm^{3+}$) representing 5% by weight and composed of two parts by weight of $Eu^{3+}$ for three parts by weight of $Tm^{3+}$.

15. A method as defined in claim 1, wherein the optically transparent glass material comprises a mixture of rare-earth ions ($Eu^{3+}/Tb^{3+}/Tm^{3+}$) representing 5% by weight and composed of 0.8 parts by weight of $Eu^{3+}$ ions, 1.2 parts of $Tb^{3+}$ ions and three parts by weight of $Tm^{3+}$ ions.

16. A method as defined in claim 1, wherein the rare-earth ions of the optically transparent glass material are used in the form of oxides.

17. A method as defined in claim 1, wherein the active center or centers of the optically transparent glass material represent from 0.1 to 40% by weight.

18. A method as defined in claim 1, wherein the optically transparent glass material comprises one or more additives chosen from fluxes and stabilizers.

19. A method as defined in claim 18, wherein the fluxes are chosen from sodium oxide, potassium oxide, magnesium oxide and mixture thereof.

20. A method as defined in claim 18, wherein the flux or fluxes represent 1 to 30% by weight.

21. A method as defined in claim 18, wherein the stabilizers are chosen from calcium oxide, zinc oxide, ion oxide and mixtures thereof.

22. A method as defined in claim 21, wherein the stabilizer or stabilizers represent 1 to 30% by weight.

* * * * *

UNITED STATES PATENT AND TRADEMARK OFFICE
CERTIFICATE OF CORRECTION

| | | Page 1 of 1 |
|---|---|---|
| PATENT NO. | : 8,741,793 B2 | |
| APPLICATION NO. | : 13/000541 | |
| DATED | : June 3, 2014 | |
| INVENTOR(S) | : Renard et al. | |

It is certified that error appears in the above-identified patent and that said Letters Patent is hereby corrected as shown below:

In the claims:

Column 12,
Line 63, claim 7, "one andene or more" should read --one or more--.

Signed and Sealed this
Seventh Day of October, 2014

Michelle K. Lee
*Deputy Director of the United States Patent and Trademark Office*